Aug. 20, 1957     Z. D. RUBEN     2,803,275
PORTABLE POWER TABLE SAW
Filed March 16, 1954
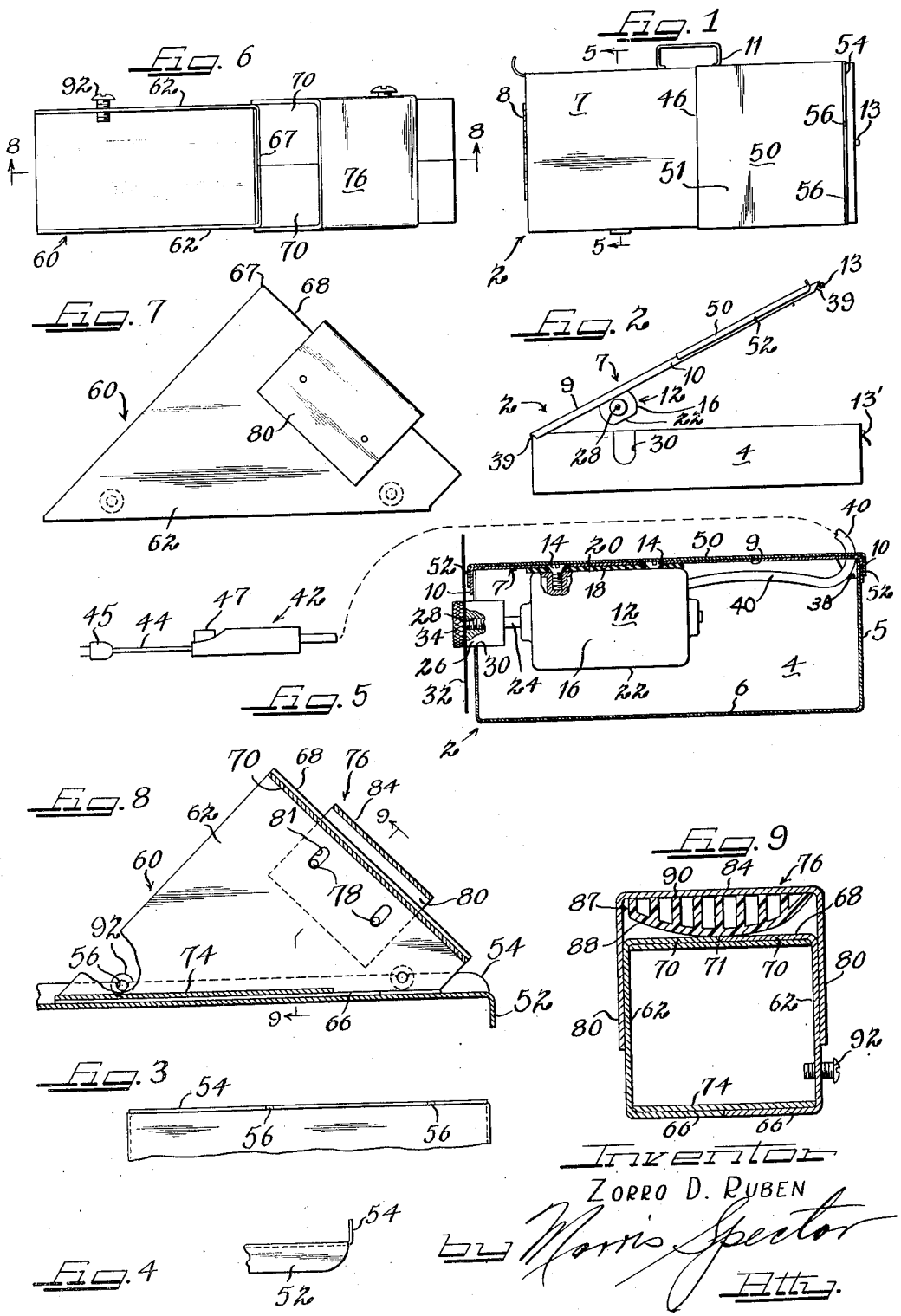
Inventor
ZORRO D. RUBEN
by Morris Spector
Atty.

United States Patent Office 2,803,275
Patented Aug. 20, 1957

2,803,275

PORTABLE POWER TABLE SAW

Zorro D. Ruben, Chicago, Ill.

Application March 16, 1954, Serial No. 416,567

9 Claims. (Cl. 144—285)

The present invention relates to motor driven tools and particularly to portable motor driven tools which are sufficiently compact and light in weight to be carried about by one person.

In the building and repair trades there are numerous instances where relatively accurate cutting operations are required at the situs of the work. For example, an artisan applying plastic tiling to a wall surface must often cut the tile squares or tile moldings to a precise size to fit the pieces into a corner of a room. Further, in fitting molding pieces together at a corner, a miter joint is often utilized. These cutting operations are difficult to accomplish accurately with ordinary portable hand tools.

It is an object of the present invention to provide a motor driven tool assembly capable of performing accurate cutting operations and which is sufficiently compact and light in weight that it may be carried about by a single person. Another object of the invention is to provide a motor driven tool assembly where the parts of the assembly are sufficiently small and compact to be stored in a relatively small storage box and adapted to be quickly and easily assembled at the situs of the work into a complete tool assembly, utilizing the storage box as a mounting frame for the assembly.

A still further object of the invention is to provide a portable motor driven tool, particularly a motor driven rotary saw which includes an electric motor, a circular saw blade, and a carriage for accurately guiding the work in relation to the saw blade, where the component parts thereof are normally storageable within a relatively small storage box and are adapted to be assembled quickly and easily into an operable machine tool, with the carriage slidable on an outer surface of the storage box. It is another object of the invention to provide a portable motor driven tool assembly of the above character where relatively large pieces of material to be cut can be handled by the machine. Another object of the invention is to provide a tool of the above character which includes a simple and compact miter attachment which may be readily connected to and disconnected from the carriage, and which is adapted to cut accurate miter joints on work pieces having curved surfaces.

Still another object of the invention is to provide a portable motor driven tool assembly which includes an electric motor which is permanently secured within the storage box body and which is adapted to receive a rotatable saw blade which extends outside of the box. A further object of the invention is to provide a portable motor driven circular saw which includes a carriage which is supported on the outside of the storage box in a manner wherein any angular movement between the axis of rotation of the motor and the plane of the work supporting surface is eliminated, to prevent any binding between the saw and the work.

Another object of the invention is to provide a motor driven tool assembly where the tool and carriage elements are secured to a storage box having an open-top box-like body and a cover in a manner which permits the cover to be raised to gain access to the space within the box without requiring the dismounting of the parts from the box.

In a preferred form of the invention, a storage box is provided having a carrying handle and a cover which is hinged to one side of the main body of the box. An electric motor is permanently secured to the bottom surface of the cover. The motor shaft carries an arbor which protrudes slightly through a slot formed in the body of the box. A circular saw blade is provided which is connectible to the arbor of the motor from the outside of the box, with the saw blade extending laterally from the side of the box, and the plane of the blade parallel to the adjacent longitudinal edge of the cover. A work supporting carriage plate is provided which has depending flanges which straddle the box cover and is movable along the longitudinal edges of the cover into cooperative relationship with the circular saw blade. Since the motor is supported from the cover and the carriage plate is guided by the edges of the cover, the plane of the saw blade remains parallel to the line of the desired cut and binding between the circular saw blade and the work on the carriage plate is prevented.

A miter attachment is provided which may be readily connected to and disconnected from the carriage plate. The miter attachment is provided with a clamping plate spaced above the inclined work supporting surface of the miter attachment. The clamping plate has a flat inner face which is adapted to be urged toward and away from the inclined surface of the miter attachment so that a work piece having a flat face and a curved face may be securely held in place on the miter attachment. Without the clamping plate, the curved piece would tend to shift in position when applied to a rotating circular saw blade if only the non-flat surface of the work piece were engaged by the miter attachment.

The saw blade, carriage plate and miter attachment may be detached from the exterior of the storage box and stored within the box when not in use.

Other objects, advantages and features of the present invention will become apparent upon making reference to the specification to follow and the drawings showing a preferred form of the invention.

In the drawings:

Fig. 1 is a top plan view of a portable machine tool of the invention showing the carriage plate in position on the cover of the box;

Fig. 2 is an elevational view of the assembly of Fig. 1 with the cover of the box in a raised position;

Fig. 3 is an enlarged fragmentary plan view of a portion of the carriage plate;

Fig. 4 is an enlarged elevational view of the portion of the carriage plate shown in Fig. 3;

Fig. 5 is an enlarged transverse section through the storage box taken along section line 5—5 in Fig. 1 and showing the saw blade in position on the motor shaft;

Fig. 6 is a plan view of the miter attachment;

Fig. 7 is an elevational view of the miter attachment;

Fig. 8 is a longitudinal section through the miter attachment along section line 8—8 in Fig. 6, and showing the attachment in position on the carriage plate; and Fig. 9 is a transverse section through the miter attachment taken along section line 9—9 in Fig. 8, with a curved molding piece secured in place on the attachment.

Reference should now be made to the drawings where similar reference characters indicate similar elements throughout.

A metal storage box 2 is provided within which the various components making up a motor driven rotary saw assembly may be stored. The storage box includes an elongated, rectangular, open-top, box-like body 4 having normally vertical sides 5, and a flat bottom 6. The open top of the body 4 is overlaid by an elongated rectangular cover 7 which is hinged at 8 along one of the short top edges of the body 4. The cover 7 has a flat top section 9 from which depend, at right angles thereto, four short peripheral flanges 10 which straddle the four sides of the box-like body 4. When the cover is lowered into position over the box body 4, the flanges 10 extend only a relatively short distance below the top edges thereof. A carrying handle 11 is secured to one of the sides 5 of the box body. Cooperating latch elements 13 and 13′ on the cover and box body lock the cover and the box body together.

An electric motor 12 is secured to the cover 7 by means of screws 14 which extend through openings in the cover and thread into the body of the motor casing 16. A rubber pad 18 is interposed between the motor casing 16 and the cover to minimize the transfer of vibrations from the motor to the cover. The motor casing is generally cylindrical in shape but is flattened on the top and bottom sides 20 and 22, respectively, to increase the compactness of the motor and to place the axis of the motor shaft as close to the top of the cover as possible. The motor extends an appreciable distance below the bottom of the cover flanges 10 and the motor shaft 24 extends at right angles to the longitudinal cover flanges and parallel to the top section 9 of the cover.

The end of the shaft 24 carries a cylindrical arbor 26 which has a threaded opening 28 formed in its outer face which is coaxial with the motor shaft. A U-shaped slot 30 is formed in the upper edge of the box-like body 4 and is adapted to receive the motor arbor 26 when the cover is pivoted into its closed position. The arbor 26 protrudes a very small distance beyond the sides of the cover on the box body. A circular saw blade 32 is connectible to the arbor 26 from outside of the box by means of a knurled screw 34 which extends through a central hole in the saw blade and threads into the threaded arbor opening 28. When the saw blade is secured to the arbor, the plane of the blade is in a vertical plane and is spaced a relatively small distance from the sides of the box.

A top corner edge of the box body 4 is cut away as at 38 (Fig. 5) to provide a pass-through opening for a power cable 40 associated with the motor 12. The corners of the cover are slotted as at 39 and the pass-through opening 38 is exposed at the corner of the box by one of the slots 39 when the cover is in its closed position. The conductor 40 outside of the storage box joins a foot operated switch 42 from which the extends a power cable 44 having a power plug 45 at the end thereof. The foot operated switch 42 has a depressible foot pedal 47 which is actuated to connect and disconnect power from the motor 12.

A flat, metal, rectangular work supporting carriage plate 50 is provided that has a pair of peripheral depending flanges 52 which extend at right angles to the plate 50 along opposite sides of the carriage plate. A pair of spaced U-shaped notches 56 are formed in the top edge of an upstanding work bearing wall 54 which extends at right angles to the flanges 52 along an edge of the carriage plate.

The rectangular carriage plate 50 rests on the top of the storage box cover 7, with the carriage plate flanges 52 closely straddling the longitudinal sides of the cover and the bearing wall 54 on the side of the carriage plate which is opposite the side facing the motor 12. The carriage plate 50 is readily slidable along the top of the cover with the sides of the cover guiding the carriage plate in a direction at right angles to the motor shaft.

A piece of tile or other material to be cut is placed on top of the carriage plate 50 with the rear edge thereof abutting the bearing wall 54. The carriage plate 50 is then manually moved toward the rotating saw blade 32 and the desired cutting operation is effected. When cutting small tiles (e. g. 4½ inch square tiles), it is not necessary to use the carriage plate at all, and the tiles are then moved manually along the top of the cover 7 into engagement with the saw blade 32.

The saw blade 32 is spaced a sufficient distance from the sides of the storage box that one of the depending carriage plate flanges 52 may freely pass between the saw blade and the sides of the box. Thus, the carriage plate may be moved completely across the cover of the box in a direction lengthwise of the cover so that the work pieces handled by the machine tool assembly may have an appreciable size measured in a direction of the desired cut. Since there are no upstanding edges on the lateral sides of the carriage plate, the material supported thereon may be of appreciable length measured in a direction parallel to the motor shaft axis. Molding strips, for example, having appreciable lengths may thus be conveniently handled by the rotary saw assembly.

A miter attachment 60 is provided which enables the operator to make a 45° angle cut on a work piece. The miter attachment 60 includes two spaced vertical side plates 62—62 having inturned bottom tabs 66—66 forming a base for the miter attachment. The vertical sides 62—62 are generally triangular in shape with the apex 67 of the triangle located at the top and centrally of the attachment. A work support surface 68 extending at a 45° angle with respect to the plane of the base-forming tabs 66—66 is formed by two inturned abutting tabs 70—70 which are formed integral with the vertical side plates 62—62. To strengthen the structure, a reinforcing plate 71 is secured as by welding to the bottom face of the tabs 70—70 and a similar reinforcing plate 74 is secured as by welding to the inner face of the base tabs 66—66.

A channel-shaped clamping member 76 is movably supported on the vertical side plates 62—62 by means of two pairs of inwardly extending nibs 78 (Fig. 8) which are struck from the flanges 80 of the member 76. The nibs are slidably received within inclined slots 81 in the side plates 62—62. The flanges 80 of the channel member 76 closely straddle the side plates 62—62 and are permanently attached thereto by the inturned nibs 78. The web 84 of the channel member presents a flat surface which is parallel to the inclined work supporting surface 68 and is movable toward and away therefrom. A work piece 87 (Fig. 9) having a curved surface 88 and a flat opposite outer surface 90 may be securely held in place on the attachment with either the curved or the flat surface of the work piece resting on the inclined miter surface 68 and the opposite surface engaged by the web 84 of the clamping member 76. If the member 76 were omitted, and it became necessary to place the curved surface 88 of the work piece faced down on the inclined miter surface 68, it would be difficult if not impossible to fix the position of the work piece on the miter attachment to provide an accurately cut miter joint. By manually pressing down on the clamping member 76 with one hand, the work piece 87 is securely held in place on the miter attachment.

The miter attachment is removably supported on the carriage plate 50 by means of a pair of screws 92 which extend laterally from one of the side plates 62. The screws are loosely threaded into apertures in the side plate so that the heads of the screws and the side plate may straddle the defining walls of the U-shaped slots 56 formed on the bearing wall 54 of the carriage plate 50. When the shanks of the screws 92 rest on the bottom of these slots, the base of the miter attachment rests flush on the top of the carriage plate 50. The miter attachment is securely fixed to the carriage plate by tightening the screws 92 against the bearing wall 54 and is orientated so that the bearing surface 68 faces the side of the storage box from which the saw blade 32 extends.

The miter attachment illustrated in the drawings is particularly designed to cut miter joints in relatively narrow mold strips, as the strip 87 shown in Fig. 9.

When the rotary saw assembly is not in use, the knurled screw 34 is unscrewed to release the saw blade from the motor arbor and the carriage plate is removed from the storage box. Then the carriage plate, the miter attachment 60, the knurled screw 34, the foot switch 42 and the associated power cables are placed within the box body 4 and the cover 7 closed and securely locked in place by the latch 13—13'. Although the distance between the carriage plate flanges 52 is greater than the width of the box body 4, it nevertheless may fit within the box since the distance between the bearing wall 54 and the front edge 96 thereof is less than the spacing between the inner walls of the box body 4.

The entire tool assembly including the storage box 2 is very compact and light in weight. In one example, the outer dimensions of the storage box was approximately 1½' x 8½" x 3½".

It should be understood that numerous modifications may be made of the specific and preferred embodiment above described without deviating from the broader aspects of the invention.

What is claimed is:

1. A portable motor driven tool assembly comprising a portable storage box having an open box-like body and a cover movable into positions to cover and uncover the open portion of the box-like body, a motor, means securing said motor to an inner surface of said box, means for removably securing a tool to the shaft of the motor within the box with the tool being completely outside of the box and spaced from the sides thereof, a removable, flat, work supporting carriage slidable on a surface of the box, and guide means for guiding the movement of the carriage in a direction at right angles to the motor shaft, said guide means comprising depending flanges means on said carriage which are guided along an outer surface of the box.

2. A portable motor driven tool assembly comprising a portable storage box having an open top box-like body and a flat top box cover having parallel sides and movable into positions to cover and uncover the open top thereof, a motor carried on the inner side of said cover and having a drive shaft which extends at right angles to said parallel cover sides and parallel to the flat top of the cover, means for removably securing a tool to said shaft with at least a portion of the tool extending outside of the box, and a removable, flat bottom, work supporting carriage slidable on the top of the cover and having depending flange means guided by at least one of said parallel sides of said cover in a direction at right angles to the motor shaft.

3. A portable motor driven tool assembly comprising a portable storage box having an open top box-like body and a flat top box cover having parallel sides hinged to said body to cover and uncover the open top thereof, a motor carried on the bottom of said cover and having a drive shaft which extends at right angles to said parallel sides of said cover and parallel to the flat top thereof, means for removably securing a tool to said shaft with at least a portion of the tool extending outside of the box, a removable, flat bottom work supporting carriage plate slidable on the top of the cover and having depending flange means guided by at least one of said parallel sides of said cover for movement in a direction at right angles to the motor shaft, said carriage plate having a width which is narrower than said box so that it may be stored in said box body when not in use, and a vertical work bearing wall on said carriage plate which extends at right angles to the direction of motion of said carriage plate and which is on the side of the carriage plate opposite the side nearest the tool.

4. A portable rotary saw assembly comprising a portable storage box having an open box-like body and a cover movable into positions to cover and uncover the open portion of the box-like body, a motor secured in place within said box, means for removably securing a rotary saw blade to said shaft with at least a portion of the blade extending outside of the box, a carriage movable on the box, means for guiding the movement of the carriage toward the saw blade, and a miter attachment supported on the carriage, said miter attachment having a flat inclined work receiving surface for inclining the work at an angle to the axis of rotation of the saw blade, and a clamping member spaced above said inclined surface and having a flat inner face which is parallel to said inclined surface and adapted to be urged toward said inclined surface to retain a work piece with opposite flat and curved faces securely in place on the attachment.

5. A portable rotary saw assembly comprising a portable storage box having an open top box-like body and a flat top cover having parallel sides and movable into positions to cover and uncover the open top of said box, a motor mounted on the bottom of said cover and having a drive shaft which extends at right angles to said parallel cover sides and parallel to the flat top of the cover, means for removably securing a rotary saw blade to said shaft with at least a portion of the saw blade extending outside of the box, a removable flat bottom, work supporting carriage slidable on the top of the cover and having depending flanges closely straddling said parallel sides of the cover, which flanges form guides for the movement of the carriage in a direction at right angles to the motor shaft, a vertical work bearing wall on said carriage plate which extends at right angles to the direction of motion of said carriage plate and which is spaced from the transverse edge of the carriage plate nearest the saw blade, and a miter attachment removably supportable on the carriage plate, said miter attachment having an inclined work receiving surface for inclining the work at an angle to the axis of rotation of the saw blade, said saw blade, carriage plate and miter attachment being of a size to be storageable within said box when not in use.

6. A portable motor driven tool assembly comprising a portable storage box having an open box-like body and a cover movable into positions to cover and uncover the open portion of the box-like body, a motor, means securing said motor to one of said cover and body, means for removably securing a tool to the shaft of the motor with at least a portion of the tool extending outside of the box, a work supporting carriage, means for guiding the movement of the carriage toward the motor shaft, and a miter attachment carried by the carriage, said miter attachment having a work holding surface for holding work directed past the side of the carriage toward the tool and downwardly below the carriage.

7. A portable rotary saw assembly comprising a portable storage box having an open box-like body and a cover movable into positions to cover and uncover the open portion of the box-like body, a motor secured in place within said box, means for removably securing a rotary saw blade to the motor shaft with the entire blade extending outside of the box, a carriage plate movable on the box, means for guiding the movement of the carriage toward the saw blade, and a miter attachment supported on the carriage, said miter attachment having a flat work receiving surface inclined with respect to the carriage plate for inclining the work at an angle to the axis of rotation of the saw blade, and a clamping member spaced above said inclined surface and having a flat inner face which is parallel to said inclined surface and adapted to be urged toward said inclined surface to retain a work piece with opposite flat and curved faces securely in place on the attachment.

8. Machine tool apparatus comprising a carrying case having an open box body and a cover for opening and closing the box body, the carrying case having a top work support surface, a motor mounted in operating position within the carrying case when the cover is in its closed position, said motor having a tool-receiving shaft portion whose axis of rotation extends generally parallel to said support surface, said case having a side opening in alignment with said shaft portion which opening enables a saw blade completely outside of said case to be secured to the motor mounted in the case while closed, a saw blade, means for securing said saw blade to said shaft portion with the blade completely outside of said box, the blade when mounted upon said shaft portion extending above said support surface, means forming an auxiliary work support surface mounted on said first support surface and in a position where it inclines toward the saw blade axis of rotation so that a work piece supported thereon may be extended over the side of the carrying case and below said first support surface, and means for guiding one of said work support surfaces and motor for movement toward the other at right angles to the axis of said shaft portion to bring the saw blade and work piece together for cutting the latter.

9. A portable motor driven tool assembly comprising a portable storage box having an open top box-like body and a cover serving as a work support surface movable into positions to cover and uncover the open portion of the box-like body, a motor carried on the inner side of said box and having a power take off shaft, a tool secured in operating position to the power take off shaft of said motor located substantially to one side of the box and with at least a portion of the tool extending outside of the box and above said work support surface, means for holding a work piece over the work support surface inclined to said motor power take off shaft and directed downwardly below the box on the tool side, and means for guiding one of said motor and work piece toward the other to bring the work and the tool together.

References Cited in the file of this patent
UNITED STATES PATENTS

| | | |
|---|---|---|
| 223,053 | Mackey | Dec. 30, 1878 |
| 695,228 | Oakley | Mar. 11, 1902 |
| 1,032,278 | England | July 9, 1912 |
| 1,831,124 | Koster | Nov. 10, 1931 |
| 2,020,216 | Sarac | Nov. 5, 1935 |
| 2,261,230 | Cox et al. | Nov. 4, 1941 |